(12) United States Patent
Sanadres et al.

(10) Patent No.: US 10,640,842 B2
(45) Date of Patent: *May 5, 2020

(54) METHOD OF PRODUCING PRESS-HARDENED AND COATED STEEL PARTS AT A HIGH PRODUCTIVITY RATE

(71) Applicant: ArcelorMittal, Luxembourg (LU)

(72) Inventors: Michel Sanadres, Pont-Saint-Maxence (FR); Christine Dessain, Villeneuve sur Verberie (FR)

(73) Assignee: ArcelorMittal, Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 16/256,336

(22) Filed: Jan. 24, 2019

(65) Prior Publication Data

US 2019/0153560 A1 May 23, 2019

Related U.S. Application Data

(62) Division of application No. 15/301,316, filed as application No. PCT/IB2015/000143 on Feb. 13, 2015.

(30) Foreign Application Priority Data

Mar. 31, 2014 (WO) .................. PCT/IB2014/000455

(51) Int. Cl.
*C21D 9/50* (2006.01)
*C23C 2/40* (2006.01)
(Continued)

(52) U.S. Cl.
CPC ............. *C21D 9/50* (2013.01); *B21D 22/022* (2013.01); *B21D 35/007* (2013.01); *C08K 3/04* (2013.01);
(Continued)

(58) Field of Classification Search
CPC .. C08K 3/04; C08K 2201/001; C09D 133/02; C09D 123/06; C09D 123/12;
(Continued)

(56) References Cited

U.S. PATENT DOCUMENTS 5,059,492 A 10/1991 Shindou et al.
6,296,805 B1 10/2001 Laurent et al.
(Continued)

FOREIGN PATENT DOCUMENTS

CN 101316942 A 12/2008
CN 202071468 U * 12/2011
(Continued)

*Primary Examiner* — Jenny R Wu
(74) *Attorney, Agent, or Firm* — Davidson, Davidson & Kappel, LLC (57) ABSTRACT

A fabrication method for a press hardened part is provided. A sheet or a steel substrate blank for heat treatment is provided. A pre-coating is applied. The pre-coating has at least one layer of aluminum or aluminum alloy in contact with the steel substrate on at least one of the principal faces of the sheet or blank. Then a polymerized layer is deposited on the pre-coating. The polymerized layer has a thickness between 2 and 30 μm. The polymerized layer does not contain silicon, has a nitrogen content of less than 1% by weight and carbon pigments in a quantity between 3 and 30% by weight. The blank or the sheet is heated to obtain an interdiffusion between the steel substrate and the pre-coating and to give the steel a partly or totally austenitic structure. Then the blank or the sheet is hot stamped to obtain a part. The part is cooled by holding the part in a stamping tool so that the microstructure of the steel substrate includes, at least in a portion of the part, martensite or bainite.

9 Claims, 5 Drawing Sheets

(51) Int. Cl.
| | |
|---|---|
| C21D 8/02 | (2006.01) |
| C09D 5/00 | (2006.01) |
| C09D 5/32 | (2006.01) |
| C23C 2/12 | (2006.01) |
| C23C 2/26 | (2006.01) |
| C23C 2/28 | (2006.01) |
| C21D 1/673 | (2006.01) |
| B21D 22/02 | (2006.01) |
| B21D 35/00 | (2006.01) |
| C08K 3/04 | (2006.01) |
| C09D 123/06 | (2006.01) |
| C09D 123/12 | (2006.01) |
| C09D 133/02 | (2006.01) |
| C09D 163/00 | (2006.01) |
| C09D 167/02 | (2006.01) |
| C21D 1/22 | (2006.01) |
| C21D 6/00 | (2006.01) |
| C21D 9/46 | (2006.01) |
| C22C 38/00 | (2006.01) |
| C22C 38/02 | (2006.01) |
| C22C 38/04 | (2006.01) |
| C22C 38/06 | (2006.01) |
| C22C 38/28 | (2006.01) |
| C22C 38/32 | (2006.01) |
| C23F 17/00 | (2006.01) |

(52) U.S. Cl.
CPC ............... *C09D 5/00* (2013.01); *C09D 5/32* (2013.01); *C09D 123/06* (2013.01); *C09D 123/12* (2013.01); *C09D 133/02* (2013.01); *C09D 163/00* (2013.01); *C09D 167/02* (2013.01); *C21D 1/22* (2013.01); *C21D 1/673* (2013.01); *C21D 6/002* (2013.01); *C21D 6/005* (2013.01); *C21D 6/008* (2013.01); *C21D 8/0205* (2013.01); *C21D 8/0247* (2013.01); *C21D 8/0278* (2013.01); *C21D 9/46* (2013.01); *C22C 38/002* (2013.01); *C22C 38/02* (2013.01); *C22C 38/04* (2013.01); *C22C 38/06* (2013.01); *C22C 38/28* (2013.01); *C22C 38/32* (2013.01); *C23C 2/12* (2013.01); *C23C 2/26* (2013.01); *C23C 2/28* (2013.01); *C23C 2/40* (2013.01); *C23F 17/00* (2013.01); *C08K 2201/001* (2013.01); *C21D 2211/001* (2013.01); *C21D 2211/002* (2013.01); *C21D 2211/008* (2013.01)

(58) Field of Classification Search
CPC ...... C09D 163/00; C09D 167/02; C09D 5/00; C09D 5/32; B21D 22/022; B21D 35/007; C21D 1/22; C21D 1/673; C21D 2211/001; C21D 2211/002; C21D 2211/008; C21D 6/002; C21D 6/005; C21D 6/008; C21D 8/0205; C21D 8/0247; C21D 8/0278; C21D 9/46; C21D 9/50; C22C 38/002; C22C 38/02; C22C 38/04; C22C 38/06; C22C 38/28; C22C 38/32; C23C 2/12; C23C 2/26; C23C 2/28; C23C 2/40; C23F 17/00
See application file for complete search history.

(56) References Cited

U.S. PATENT DOCUMENTS

| | | |
|---|---|---|
| 6,564,604 B2 | 5/2003 | Kefferstein et al. |
| 7,186,467 B2 | 3/2007 | Nakamaru et al. |
| 7,867,344 B2 | 1/2011 | Kusumi et al. |
| 8,936,836 B2 | 1/2015 | Domes et al. |
| 9,296,919 B2 | 3/2016 | Atsushi et al. |
| 9,375,809 B2 | 6/2016 | Canourgues et al. |
| 9,689,050 B2 | 6/2017 | Bouaziz et al. |
| 9,821,858 B2 | 11/2017 | Maki et al. |
| 9,901,969 B2 | 2/2018 | Miyazaki et al. |
| 2005/0147832 A1 | 7/2005 | Okai et al. |
| 2007/0092742 A1 | 4/2007 | Spaans et al. |
| 2009/0011274 A1 | 1/2009 | Ogata et al. |
| 2009/0220815 A1 | 9/2009 | Canourgues et al. |
| 2012/0085466 A1 | 4/2012 | Lupp et al. |
| 2012/0128926 A1 | 5/2012 | Ohishi et al. |
| 2012/0135263 A1 | 5/2012 | Kobayashi et al. |
| 2012/0291510 A1 | 11/2012 | Kim et al. |
| 2013/0011998 A1 | 1/2013 | Shinoda et al. |
| 2014/0048181 A1 | 2/2014 | Banik et al. |
| 2015/0030382 A1 | 1/2015 | Cretteur et al. |
| 2015/0004396 A1 | 2/2015 | Miyazaki et al. |
| 2015/0147589 A1 | 5/2015 | Bouaziz |
| 2015/0225830 A1 | 8/2015 | Nonaka et al. |
| 2017/0240991 A1 | 8/2017 | Banik et al. |
| 2017/0268078 A1 | 9/2017 | Sanadres et al. |
| 2017/0341187 A1 | 11/2017 | Cretteur et al. |

FOREIGN PATENT DOCUMENTS

| | | | |
|---|---|---|---|
| CN | 202071468 U | 12/2011 | |
| CN | 102482741 A | 5/2012 | |
| CN | 103917329 A | 7/2014 | |
| DE | 102007011553 A1 | 9/2008 | |
| EP | 2007545 B1 | 7/2009 | |
| EP | 2312005 A1 | 4/2011 | |
| EP | 2463395 A1 | 6/2012 | |
| FR | 2780984 A1 | 1/2000 | |
| FR | 2807447 A1 | 10/2001 | |
| JP | 2004211151 A | 7/2004 | |
| JP | 2005314737 A | 11/2005 | |
| JP | 2005336511 A | 12/2005 | |
| JP | 2006051543 A | 2/2006 | |
| JP | 2008195999 A | 8/2008 | |
| JP | 2013515618 A | 5/2013 | |
| KR | 20130132644 A | 12/2013 | |
| RU | 2336173 C2 | 10/2008 | |
| WO | 2008053273 A1 | 5/2008 | |
| WO | 2012092337 A2 | 7/2012 | |
| WO | 2010137726 A1 | 11/2012 | |
| WO | 2013034815 A1 | 3/2013 | |
| WO | WO-2013034815 A1 * | 3/2013 | ............... C21D 6/02 |
| WO | WO2013147035 A1 | 10/2013 | |
| WO | WO2013157522 A1 | 10/2013 | |
| WO | WO2014024831 A1 | 2/2014 | |

\* cited by examiner

METHOD OF PRODUCING PRESS-HARDENED AND COATED STEEL PARTS AT A HIGH PRODUCTIVITY RATE

This is a divisional of U.S. application Ser. No. 15/301,316, filed Sep. 30, 2016 as a National Phase Application of International Patent Application No. PCT/IB2015/000143, filed Feb. 13, 2015 which claims priority to International Patent Application No. PCT/IB2014/000455, filed Mar. 31, 2014, the disclosures of which are hereby incorporated by reference herein.

This invention relates to a fabrication method for parts from pre-coated steel sheets that are heated, stamped and then hardened during a cooling obtained by holding in a pressing tool; these parts are intended to be used as, among other things, structural elements in automotive vehicles to perform anti-intrusion or energy absorption functions. Parts of this type can also be used, for example, for the fabrication of tools or parts of agricultural machinery.

BACKGROUND

In this type of applications, the objective is to produce steel parts that combine high mechanical strength, good corrosion resistance and good weldability. It must also be possible to fabricate these hot stamped parts using high productivity methods. These requirements apply in particular in the automobile industry, where the objective is to reduce significantly the weight of the vehicles. Anti-intrusion parts or parts that play a role in the safety of automotive vehicles such as bumpers, door reinforcements or center pillars, for example, require the qualities indicated above. These qualities can be obtained in particular thanks to steel parts, the microstructure of which is martensitic or bainitic-martensitic.

The fabrication of parts of this type is known in particular from publications FR2780984 and FR2807447, according to which a blank cut in a steel sheet for heat treatment, pre-coated with a metal or metallic alloy, is heated in a furnace and then hot stamped. The pre-coating can be aluminum or an aluminum alloy, zinc or zinc alloy. During the heating in the furnace, this pre-coating alloys with the steel substrate to form a compound that provides protection of the surface of the steel against decarburization and the formation of scalet. This compound is suitable for hot forming. Holding the piece in the tool after forming makes a rapid cooling possible, which leads to the achievement of hardened microstructures in the steel substrate, which are associated with good mechanical characteristics of strength and hardness. This method is known as "press hardening".

In a method of this type, the blanks are generally heated in continuous furnaces, whereby the blanks are moved forward in these furnaces on rollers. This phase comprises a heating step followed by a temperature hold in the furnace, generally at around 900-950° C. The hold temperature and the hold time are a function of, among other things, the thickness of the blanks and the type of pre-coating on the blanks. For productivity reasons, it is desirable to employ methods that make it possible to shorten the step of heating in the furnace as much as possible. In this regard, publication EP2312005 discloses a method in which a coil of steel with an aluminum pre-coating is provided and is then annealed at 600-750° C. for a period of time ranging from 1 hour to 200 hours. A diffusion of the iron from the substrate to the pre-coating occurs, to the point where a pre-alloy product is obtained. After cutting, these pre-alloyed blanks can be heated more rapidly, in particular on account of the emissivity modification caused by the pre-alloying treatment. However, this method requires a prior, time-consuming annealing of the coil.

Document EP2463395 also proposes to accelerate the kinetics of the heating phase by locally reducing the reflectivity of a blank by means of various methods: prior application of black paint, modification of surface roughness by shot blasting, by rolling, laser or immersion etching in an acid solution. This document also describes examples in which pigments in the aqueous phase or polyester/melamine based black paint in a solvent phase have been deposited on galvanized pre-coatings. Considering the conventional mixing rate: 90-92% polyester and 8-10% melamine ($C_{15}H_{30}N_6O_6$) in the paint layer after drying and a maximum pigment concentration by volume of 30%, the nitrogen content in the paint layer used in these tests is on the order of 1.7 to 2.4%% after drying. However, this method completely disregards certain essential problems linked to the later utilization of these parts. After hot stamping, the parts must be suitable for painting by cataphoresis, must be weldable and corrosion resistant. However, as will be shown below, the application of a conventional black paint that is resistant to high temperatures before hot stamping does not make it possible to obtain these properties.

Attempts have therefore been made to identify a method that makes it possible to simultaneously increase the productivity of the hot stamping process and to control the process so that the hot stamped and hardened parts thus obtained are compatible with conventional industrial production conditions, i.e. they do not require, for example, a modification of the existing settings of resistance spot welding machines for the assembly of these parts. This method must also be compatible with the fabrication of welded blanks pre-coated with an aluminum coating that requires prior ablation of a portion of the pre-coating on the periphery of the blank, as described in document EP2007545.

Attempts have also been made to identify a method that is relatively insensitive to certain potential variations of the fabrication conditions. In particular, attempts have been made to devise a method, the results of which are relatively insensitive to the preparation conditions of the pre-coated blank.

Moreover, a method is sought that will make it possible to obtain excellent resistance to delayed cracking. It is known that press hardening makes it possible to obtain parts with extremely high mechanical strength, the microstructure of which can be sensitive to cracking due to the presence of hydrogen in the presence of stresses, for example those resulting from the cutting of the parts. Attempts have therefore been made to define a method that does not present any increased risk of delayed cracking or that would even make it possible to reduce sensitivity to this risk.

Additional attempts have been made to define a method that makes it possible to fabricate welded blanks from sheets of different thicknesses that would not result in a significantly different heating rate in the different parts of these welded blanks.

Finally, attempts have been made to devise a method in which the constituent steps and the physical elements make the implementation of the method possible without resulting in prohibitive cost increases.

SUMMARY OF THE INVENTION

Surprisingly, the inventors have shown that the problems mentioned above can be solved economically thanks to the deposition before hot stamping of a polymerized layer on a pre-coating comprising at least one layer of aluminum or aluminum alloy, wherein the polymerized layer is composed of a specific polymer containing carbon pigments in a quantity between 3 and 30% by weight.

To this end, an object of the invention is a pre-coated sheet or blank comprising a steel substrate for heat treatment 1 overlaid over at least a portion of at least one of its main faces by a pre-coating 2 comprising at least one layer of aluminum or aluminum alloy, overlaid over at least a portion of the pre-coating by a polymerized layer 3 having a thickness between 2 and 30 μm composed of a polymer that does not contain silicon and the nitrogen content of which is less than 1% by weight expressed in relation to the layer, wherein the polymerized layer contains carbon pigments in a quantity between 3 and 30% by weight, expressed in relation to the layer.

Preferably, the elements of the polymer are selected from a list consisting of C, H, O, N.

In one preferred embodiment, the polymerized layer is obtained from a resin in the form of a dispersion or an emulsion in aqueous phase.

According to another preferred embodiment, the polymerized layer is obtained from a resin in the form of solution in a non-aqueous solvent.

In another preferred embodiment, the polymerized layer consists of a film that is roll bonded to the substrate.

Preferably, the polymerized layer is obtained from an acrylic type resin.

In one preferred embodiment, the polymerized layer is obtained from an epoxy or acrylic type resin in the form of solution in a non-aqueous solvent.

In another preferred embodiment, the polymerized layer consists of a polyethylene terephthalate or polyethylene or polybutylene-terephthalate or polypropylene film.

The pigments are constituted preferably at least partly of activated carbon.

In one preferred embodiment, the pigments are constituted at least partly of graphite.

The quantity of activated carbon in the polymerized layer is preferably less than 5%, expressed by weight in relation to the layer.

Preferably, the aluminum or aluminum alloy layer constitutes more than 50% of the thickness of the pre-coating.

An additional object of the invention is a sheet or a blank according to one of the embodiments described above, characterized in that the pre-coating comprises a layer of intermetallic alloy 4 in contact with the substrate 1 overlaid by a layer of metallic aluminum alloy 5 and in that, on at least one pre-coated surface of the sheet, the polymerized layer and the metallic alloy layer are not present in a zone 6, wherein this zone is located on the periphery of the sheet or of the blank.

An additional object of the invention is a welded blank obtained by welding at least two blanks, wherein at least one of the blanks 7 is a blank according to any one of the above characteristics having a thickness $e_7$, and at least one of the blanks is a blank 8 having a thickness $e_8$ constituted by a steel substrate coated by a layer of aluminum or aluminum alloy identical to that of the blank 7, wherein the thickness of the blanks 7 and 8 is such that $$\frac{e_7}{e_8} > 1.$$

The blank (7) is preferably a blank coated over the entire pre-coating of the polymerized layer 3, and the thicknesses $e_7$ and $e_8$ are such that:

$$2.6 \geq \frac{e_7}{e_8} \geq 2.2.$$

An additional object of the invention is a part 9 obtained by austenitization, followed by hot stamping and hardening by holding in the stamping tool, of a sheet or of a blank having a pre-coating comprising at least one layer of aluminum or aluminum alloy, wherein the microstructure of the substrate 10 of the part contains martensite and/or bainite, wherein the substrate is overlaid on at least one of its principal surfaces by a coating 11 resulting from the interdiffusion between the steel substrate and the pre-coating, wherein the coating 11 is overlaid by a layer of oxide 12, wherein the average percentage of oxygen by weight, between 0 and 0.01 μm below the surface of the part, is less than 25% and the average percentage of oxygen by weight, between 0.1 and 0.2 μm below the surface, is less than 10%.

An additional object of the invention is a method for the fabrication of a press-hardened part comprising the following steps in succession:

a steel sheet or blank substrate for heat treatment is provided, a pre-coating is performed comprising at least one layer of aluminum or aluminum alloy in contact with the steel substrate on at least one of the main faces of the sheet or of the blank, then, on the pre-coating, a polymerized layer 3 is deposited having a thickness between 2 and 30 μm, composed of a polymer that does not contain silicon and the nitrogen content of which is less than 1% by weight expressed in relation to the layer, wherein the polymerized layer contains carbon pigments in a quantity between 3 and 30% by weight, expressed in relation to the layer, then the blank or the sheet is heated to obtain an interdiffusion between the steel substrate and the pre-coating, to obtain a partly or completely austenitic structure on the steel, then the blank or the sheet is hot stamped to obtain a part, then the part is cooled by holding it in the stamping tool so that the microstructure of the steel substrate contains, at least in a portion of the part, martensite and/or bainite.

In one preferred embodiment, the thickness of the sheet or of the blank is between 1 and 2 mm, and the heating rate of the blank or of the sheet between 50 and 500° C. is between 15 and 35° C./s.

Preferably, the layer of aluminum or aluminum alloy occupies more than 50% of the thickness of the pre-coating.

In one preferred embodiment, the elements of the polymer are selected from a list consisting of C, H, O, N.

An additional object of the invention is a method for the fabrication of a welded blank hot stamped and press hardened, comprising the following steps in succession:

a welded blank created by welding at least two blanks is provided, comprising at least one blank 7 according to one of the above characteristics, having a thickness $e_7$, at least one blank 8 having a thickness $e_8$ constituted by a steel substrate coated with a layer of aluminum or aluminum alloy of a pre-coating identical to that of the blank 7, wherein the thickness of the blanks 7 and 8 is such that $$\frac{e_7}{e_8} > 1,$$

the welded blank is heated to effect an interdiffusion between the steel substrate and the pre-coating and to confer a partly or totally austenitic structure on the steel, then the welded blank is stamped to obtain a hot stamped welded blank, then the hot stamped welded blank is cooled by holding [it] in the stamping tool to obtain, in at least a portion of the substrate of the hot stamped welded blank, martensite and/or bainite.

Preferably, the welded blank, hot stamped and hardened according to the invention is characterized in that the blank 7 is coated over the entire pre-coating, by the polymerized layer 3, and in that:

$$2.6 \geq \frac{e_7}{e_8} \geq 2.2,$$

BRIEF DESCRIPTION OF THE DRAWINGS

Additional characteristics and advantages of the invention will become apparent in the following description, which is given by way of example with reference to the accompanying drawings, in which.

It should be noted that these diagrams do not attempt to reproduce the relative dimensions of the different constituent elements to scale.

In comparison.

DETAILED DESCRIPTION

The thickness of the steel sheet used in the method according to the invention is preferably between approximately 0.5 and 4 mm, a thickness range used in particular in the fabrication of structural or reinforcement parts for the automobile industry.

The steel of the substrate is a steel for heat treatment, i.e. a steel capable of hardening after austenitization and rapid cooling by quenching.

By way of example, the steel advantageously contains the following elements, wherein the composition is expressed in percent by weight:

A carbon content between 0.07 and 0.5%, preferably between 0.09 and 0.38% by weight, and very preferably between 0.15 and 0.25% by weight. This element plays a major role in the hardenability and in the mechanical strength obtained after the cooling that follows the austenitization treatment. Below a content of 0.07% by weight, the suitability for hardening is reduced and the mechanical tensile strength after press hardening is insufficient. A content of 0.15% C makes it possible to guarantee sufficient hardenability in the most highly hot-worked zones. Above a content of 0.5% by weight, the risk of the formation of defects increases during hardening, particularly for parts with the greatest thickness. It also becomes difficult to guarantee ductility during the bending of parts after press hardening. A carbon content between 0.09 and 0.38% makes it possible to obtain a tensile strength Rm between approximately 1000 and 2050 MPa when the microstructure of the part is totally martensitic.

In addition to its deoxidizing role, manganese also has a significant effect on hardenability in particular when it is present in quantities of more than 0.5% by weight, and preferably greater than 0.8% by weight. However, it is preferable to limit its addition to 3% by weight, and very preferentially to limit it to 1.5%, to prevent excessive segregation.

The silicon content of the steel must be between 0.02 and 0.5% by weight, and preferably between 0.1 and 0.35%. In addition to its role in the deoxidation of the liquid steel, this element contributes to the hardening of the steel, although its concentration must be limited to prevent the excessive formation of oxides and to prevent any adverse effect on its hot-dip coatability.

Above a concentration greater than 0.01%, chromium increases hardenability and contributes to achieving high strength after the hot working operation. Above a concentration equal to 1%, preferably 0.3%, the effect of chromium on the uniformity of the mechanical properties in the part is saturated.

Aluminum is an element that promotes the oxidation and precipitation of nitrogen. In excessive quantities, coarse aluminates are formed during steelmaking, which tends to reduce ductility, as a result of which the aluminum content is limited to 0.25% by weight. A minimal concentration of 0.001% makes it possible to oxidize the steel in the liquid state during processing.

In excessive quantities, sulfur and phosphorus result in increased embrittlement. That is why is preferable to limit the levels of these elements to 0.05 and 0.1% by weight respectively.

Boron, the content of which must be between 0.0005 and 0.010% by weight, and preferably between 0.002 and 0.005% by weight, is an element that plays an important role in terms of hardenability. Below a content of 0.0005%, a sufficient effect on hardenability is not obtained. The full effect is obtained for a content of 0.002%. The maximum boron content must be less than 0.010%, and preferably 0.005%, so as not to have an adverse effect on toughness.

Titanium has a strong affinity for nitrogen. It protects the boron so that this element is in the free form, which allows it to have its full effect on hardenability. Above 0.2%, however, there exists a risk of forming coarse titanium nitrides in the liquid steel, which have a negative effect on toughness. The titanium content is preferably between 0.02 and 0.1%.

Optionally, the steel can also comprise tungsten in a quantity between 0.001 and 0.3%% by weight. In the indicated quantities, this element increases hardenability and suitability for hardening thanks to the formation of carbides.

Optionally, the steel can also contain calcium in a quantity between 0.0005 and 0.005%. By combining with oxygen and sulfur, calcium prevents the formation of large inclusions, which have an undesirable effect on the ductility of the sheets, or the parts fabricated from them.

The balance of the composition of the steel consists of iron and the unavoidable impurities resulting from processing.

Preferably, 22MnB5 steel will be used that contains, in percent by weight: 0.20-0.25% C, 1.1-1.35% Mn, 0.15-0.35% Si, 0.02-0.06% Al, 0.02-0.05% Ti, 0.02-0.25% Cr, 0.002-0.004% B, the balance consisting of iron and unavoidable impurities.

The steel substrate comprises a pre-coating of aluminum or an aluminum alloy. In the latter case, the coating therefore contains an aluminum content greater than 50% by weight. This pre-coating, which is preferably applied by a continuous hot dip process, is advantageously an aluminum-silicon alloy comprising 7-15% silicon by weight, 2 to 4% iron by weight, optionally between 15 and 30 ppm calcium, the remainder consisting of aluminum and unavoidable impurities resulting from processing.

The pre-coating can also be an aluminum alloy containing 40-45% Zn, 3-10% Fe, 1-3% Si, the balance consisting of aluminum and the unavoidable impurities resulting from processing.

The pre-coating can also be composed of a superimposition of layers deposited in successive steps, at least one of which layers is aluminum or an aluminum alloy. The layer of aluminum or aluminum alloy (or, if there are a plurality of layers of this type, the sum of the thicknesses of these layers) preferably occupies more than 50% of the thickness of the pre-coating.

This pre-coating is overlaid, on at least one of the main surfaces of the sheet, by a polymerized layer containing carbon pigments. This layer can be deposited over the totality of the metallic pre-coating or only on a portion of it. In this latter case, the effects conferred by this layer, described below, are obtained in the zones where the layer is present. With regard in particular to the thermal effects of this layer, they also apply to a lesser extent in zones that are locally adjacent to those in which the layer has been deposited.

This polymerized layer can in particular be obtained by the following steps:
- starting with a resin in the form of a dispersion or an emulsion in aqueous phase. In particular, an acrylic type resin can be used.
- starting with a resin in the form of solution in a non-aqueous solvent. In particular, an epoxy type resin can be used, for example an epoxy-phenol or acrylic resin.
- starting with a thermoplastic polymer film roll bonded to the substrate sheet.

In particular, a polyethylene-terephthalate or polyethylene or polybutylene-terephthalate or polypropylene film can be used.

For reasons of productivity and regularity of thickness, this layer can preferably be deposited by roll coating. After polymerization and/or drying, a polymerized layer is obtained, the thickness of which is between 2 and 30 μm. A thickness less than 2 μm does not make it possible to obtain a sufficient rate of coverage to implement the method. A thickness greater than 30 μm leads to an increased risk of contamination of the furnaces during the subsequent heating.

Figure 1:
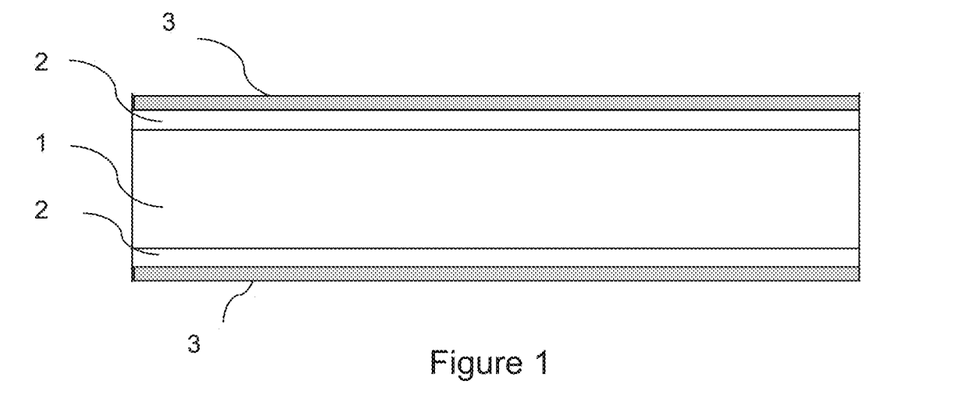
FIG. 1 illustrates a schematic example of a pre-coated sheet or blank according to the invention, before hot stamping.

The sheet or pre-coated blank is illustrated schematically in FIG. 1. FIG. 1 illustrates the steel substrate for heat treatment 1 overlaid by a metallic pre-coating 2, which is itself overlaid by a polymerized layer 3 containing carbon pigments.

At this stage, the steel substrate is still not hardened, i.e. it does not contain any constituent parts, or at least only a few constituent parts, resulting from hardening, for example less than 10% martensite. The sheet or the blank have an essentially flat shape.

In the press hardening method, the steel substrate is heated to a temperature $T_\gamma$ that results in its austenitization, at least partly, to achieve a martensitic or bainitic transformation during the subsequent cooling. If a sheet coated with the paint is to be heated to such a temperature, it would then be natural to select a paint that is resistant to a temperature T greater than $T_\gamma$, i.e. one in which the binder retains its function with regard to the pigments in the paint. It is known that pigments that are resistant to high temperatures are generally silicone or polysiloxane resins that therefore contain silicon. In fact, they are based on Si—O—Si chains that contain very stable bonds and are resistant to high temperature. However, the inventors have surprisingly discovered that it is necessary to use polymers that do not contain silicon. The advantageous effects explained below are obtained when the constituent elements of the polymers are selected from among carbon, hydrogen, oxygen or nitrogen. During heating, these polymers break down at a temperature below $T_\gamma$ and are partly combined with the oxygen of the furnace atmosphere. It would then be expected that the pigments of the paint, deprived of binder, would no longer adhere to the substrate and would become disconnected. There might also be reason to fear that after heating, there would be a layer originating from the decomposition of the paint that would prevent the later implementation of cataphoresis or resistance welding. However, the inventors have shown that surprisingly, these undesirable consequences do not occur under the conditions of the invention.

The nitrogen content of the polymerized layer 3 must be limited to 1%, preferably 0.5%, and very preferably 0.2%, under penalty of forming compounds of the HCN type or excessive quantities of ammonia during heating to the temperature necessary for stamping.

The content by weight of carbon pigments, expressed in relation to the polymerized layer 3, is between 3 and 30%. Below 3%, the reduction of the heating cycle time is insufficient. Above 30%, the mixture has a viscosity unsuitable for application. In this range of contents, the part obtained after hot stamping has practically no surface enrichment in carbon, as will be shown below.

The carbon pigments can be in the form of graphite or activated carbon. The latter, which is obtained by a high temperature carbonization step, has an amorphous structure and a large specific surface area that gives it a high adsorbent power. The content by weight of activated carbon, expressed in relation to the deposited layer, must be less than 5% to be suitable for mixing with the polymer.

The blanks comprising the metallic pre-coating and the layer of polymer containing the particles of carbon are heated in a furnace under an ordinary atmosphere from the ambient temperature to a temperature $T_\gamma$, conventionally in the neighborhood of 900° C., which makes the subsequent hot stamping possible. During the heating, the carbon in the layer remains present on the surface of the blank for the largest part of this heating step, i.e. its effect on the reflectivity is exerted over the majority of this step and it therefore contributes to reduce very significantly the duration of the step. Under the conditions of the invention, the inventors have found that it gradually combines with the oxygen in the furnace during the heating and disappears almost completely when the blank reaches the temperature $T_\gamma$. The inventors have also found that the application of paint according to the invention does not require a subsequent sandblasting treatment to eliminate a potential oxide layer, which could have an adverse effect on a subsequent painting by cataphoresis. The application of the paint according to the invention does not modify the suitability for resistance welding of the parts after hot stamping, so that it is not necessary to modify the settings of the welding machines. In addition, as will be shown below, the method according to the invention makes it possible to increase the resistance to delayed cracking of the hot stamped parts, on account of the reduction of the content of diffusible hydrogen. The application of the paint according to the invention does not reduce the corrosion resistance of the hot stamped parts.

Figure 2:
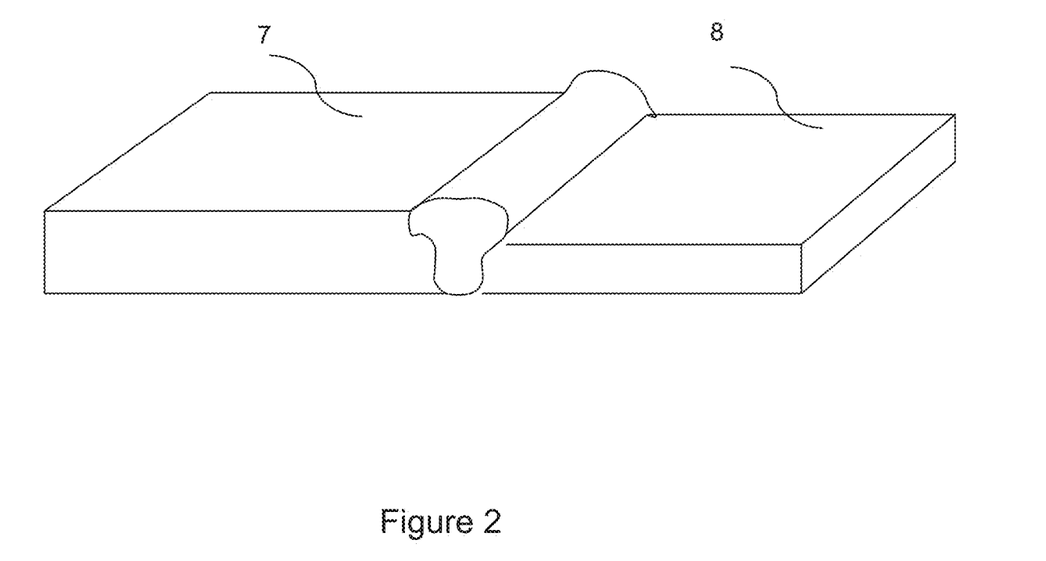
FIG. 2 illustrates a schematic example of a blank welded according to the invention in which the two blanks do not have the same thickness.

The invention can be implemented in one particular mode which is illustrated in FIG. 2, which schematically shows a welded blank comprising two blanks 7 and 8 having respective thicknesses $e_7$ and $e_8$ such that $$\frac{e_7}{e_8} > 1.$$

These two blanks comprise a steel substrate pre-coated with aluminum or aluminum alloy, wherein the pre-coating is identical on both blanks. The welded joint can be created by any appropriate method, in particular by arc welding or by laser welding. If a welded seam of this type is heated for hot stamping, the different thicknesses of the constituent parts results in a different heating kinetic in the two parts, wherein the blank 7 is heated less rapidly than the thinner blank 8. That in turn can lead to different microstructures and different properties in the substrate and in the coating of the parts 7 and 8 after hot stamping. In certain cases, it is not possible to determine satisfactory operating conditions, such as the heating temperature and the hold time, to obtain the desired properties in the different constituent zones of the welded joint.

The invention teaches that a layer of polymer described above is deposited to obtain a polymerized layer containing 3 to 30% carbon pigments on the thicker blank 7. The thinner blank 8 does not have such a layer on the aluminum or aluminum alloy pre-coating. Depending on the desired uniformity of properties over the hot stamped part, it is possible to deposit the layer over the entire blank 7 or only over a portion of it. The welded blank is then placed in a furnace. The prior application of the layer of paint makes it possible to increase the emissivity of the blank 7 and to reduce the difference in the heating rate between the two blanks 7 and 8 resulting from their difference in thickness. The inventors have shown that when the blanks are provided in such form that $$2.6 \geq \frac{e_7}{e_8} \geq 2.2,$$

the duration of heating is practically the same in parts 7 and 8, because the application of the layer of paint according to the invention modifies the emissivity to compensate almost entirely for the effect of the difference between the thicknesses of blanks 7 and 8 on the heating cycle, which guarantees excellent uniformity of the properties of the part after hot stamping and press hardening.

The blanks 7 and 8 can be pre-coated, for example, with an aluminum-silicon alloy comprising by weight 7-15% silicon, 2 to 4% iron, optionally between 15 and 30 ppm calcium, the remainder consisting of aluminum and the unavoidable impurities resulting from processing. Under these conditions, as illustrated schematically in FIG. 3, the pre-coating 2 comprises an intermetallic alloy layer 4 several micrometers thick comprising in the majority $Fe_2Al_3$, $Fe_2Al_5$ and $Fe_xAl_ySi_z$, in contact with the steel substrate 1. This intermetallic layer 4 is overlaid by a layer of metallic alloy Al—Si—Fe 5. On the thicker blank 7, this layer 5 is itself overlaid by a layer of polymer 3 described above, containing 3 to 30% carbon pigments. To prevent the formation of brittle intermetallic compounds in the molten zone during welding, the layer of metallic alloy 5 is removed on the periphery of the blanks, leaving the thin layer of intermetallic alloy 4 in place. This local ablation can be carried out by any means, in particular by melting and vaporization using a pulsed laser. The inventors have shown that the presence of the polymer layer with the carbon pigments does not interfere with the ablation, which can be carried out under satisfactory conditions of productivity. By way of example, the desired results can be obtained using a laser power of 50 W to 1.5 kW, ablation rates on the order of 3 to 6 m/mn and a wavelength of 300 to 1500 nm.

Figure 3:
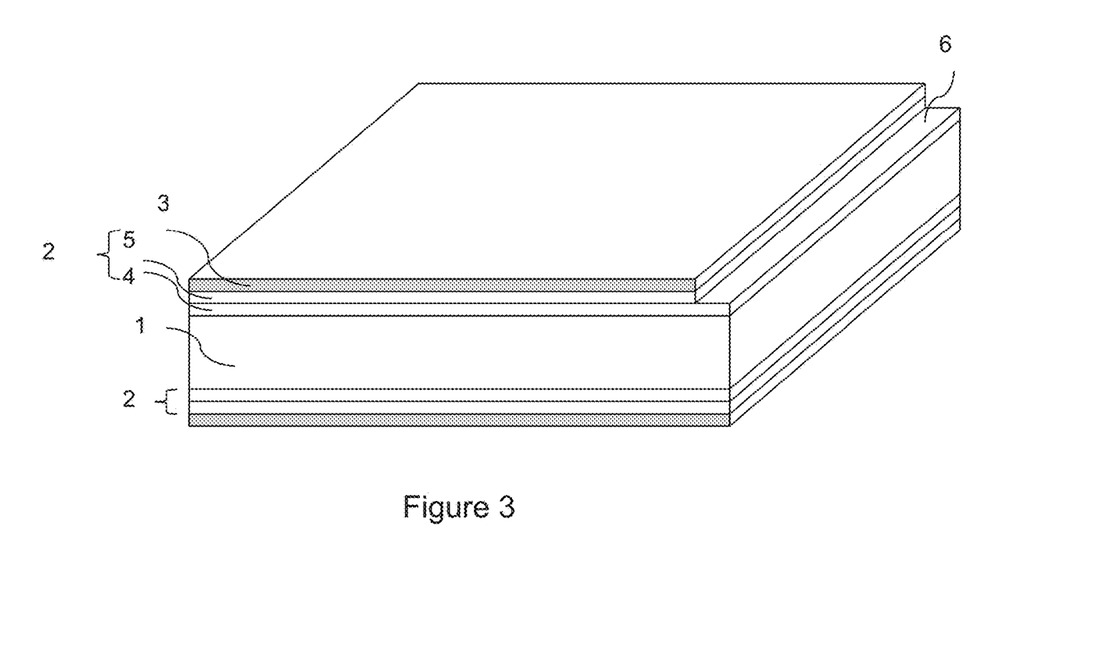
FIG. 3 illustrates a schematic example of a blank according to the invention intended to be laser welded then hot stamped.
Figure 4:
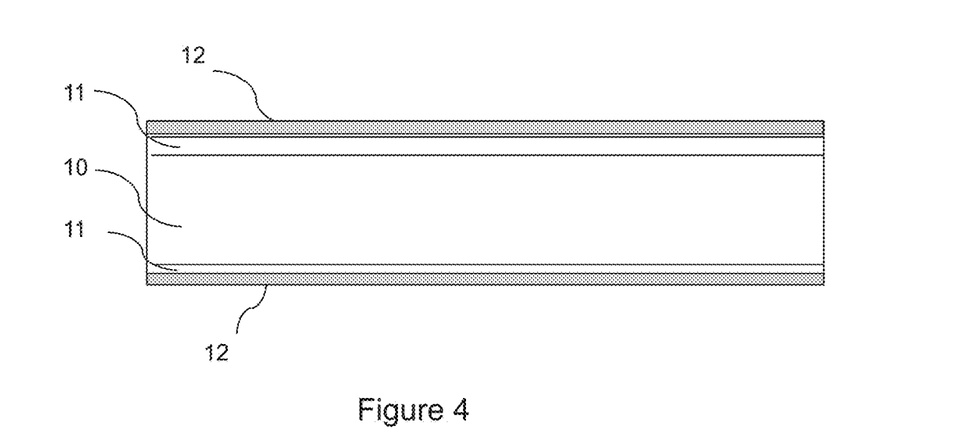
FIG. 4 is a schematic illustration of an example of the constitution of the layers observed on a hot stamped piece according to the invention.

FIG. 3 illustrates one example where the layer of paint 3 and a layer of metallic alloy 5 have been removed on one edge of a pre-coated painted blank. The intermetallic coating 4 is therefore exposed on the surface 6 after this ablation. FIG. 3 illustrates an example where the ablation has been carried out on a single surface of the blank. It is also possible to perform this ablation on both faces when it is desirable to minimize the quantity of aluminum introduced into the molten welding metal by remelting.

The blanks are welded along the edge where the ablation has been performed. The blanks are then heated, hot stamped and press hardened.

The inventors have shown that the method according to the invention makes it possible to fabricate hot stamped parts that have good suitability for spot welding and painting by cataphoresis, good resistance to corrosion and to delayed cracking.

By way of non-restrictive examples, the following embodiments illustrate the advantages achieved by the invention.

Example 1

Blanks 1 mm thick were provided made of steel having the following composition in percent by weight: 0.228% C, 1.189% Mn, 0.014% P, 0.001% S, 0.275% Si, 0.028% Al, 0.034% Ti, 0.003% B, 0.177% Cr, the balance being iron and impurities resulting from processing. These blanks comprise a pre-coating 24 μm thick on each surface, containing 9% by weight silicon, 3% by weight iron, the balance being aluminum and unavoidable impurities. On some of these blanks, a layer was then deposited by roll coating over the entirety of the two surfaces composed of polymer and carbon pigments, in aqueous phase, under the different conditions indicated in the table below. The acrylic phenoxy resin contains less than 0.2% nitrogen on the deposited layer. The percent by weight of carbon pigments in these roll-coated layers is indicated in Table 1 below. The layers deposited were dried by passing through a kiln at 70° C. for 5 minutes.

TABLE 1

Test conditions
(I = Invention, R = Reference)

| Test | Type of polymer of the layer deposited on the pre-coating | Percent by weight of activated carbon pigments expressed in relation to the layer after drying (%) | Percent by weight of graphite carbon pigments, expressed in relation to the layer after drying (%) | Thickness of the layer deposited after drying (micrometers) |
|---|---|---|---|---|
| I1 | Acrylic-phenoxy resin | 5 | — | 15 |
| I2 | Acrylic-phenoxy resin | — | 15 | 15 |
| I3 | Acrylic-phenoxy resin | 1 | 12 | 15 |
| I4 | Acrylic-phenoxy resin | 1 | 12 | 11 |
| I5 | Acrylic-phenoxy resin | 1 | 12 | 26 |
| R1 | Polysiloxane | 0 | 0 | 30 |
| R2 | No polymer coating, no carbon pigments | — | — | — |

Thermogravimetric analyses show that the majority of the acrylic resin decomposes at approximately 400° C.

Steel blanks prepared under the conditions indicated in the above table were heated from the ambient temperature to 900° C. in a furnace under an ordinary atmosphere, held at this temperature for one minute, then hot stamped and temper-hardened by holding them in the stamping tool. The rapid cooling thus obtained convers a martensitic structure on the steel substrate. The mechanical strength Rm is about 1500 MPa.

The thermal cycle causes an alloying of the iron of the substrate with the coating, thereby creating intermetallic alloys containing essentially aluminum, iron and silicon.

In each of the above conditions, thermocouples were used to measure the duration of heating $\Delta t_{20}^{900}$, i.e. the time that elapses between the instant when the blank is at ambient temperature and when it reaches 900° C. The results are presented in Table 2.

TABLE 2

Duration of heating from 20 to 900° C.

| Test | $\Delta t_{20}^{900}$ (s) |
|---|---|
| I1 | 70 |
| I2 | 70 |
| I3 | 70 |
| I4 | 70 |
| I5 | 70 |
| R1 | 68 |
| R2 | 165 |

The application of a polymerized layer comprising carbon pigments (tests I1 to I5 and R1) makes it possible to reduce the heating time by more than 50% compared to the metallic pre-coating alone (test R2).

The average rate obtained during heating between 50 and 500° C. was also measured on blanks prepared under the conditions I3 and R2 having a thickness between 1 and 2 mm. Table 3 presents the results obtained.

TABLE 3

Heating rate between 50 and 500° C.

| Test | Thickness (mm) | V20-500° C. (° C./s) |
|---|---|---|
| I3 | 1 | 31 |
|  | 1.5 | 22 |
|  | 2 | 16 |
| R2 | 1 | 12 |
|  | 1.5 | 10 |
|  | 2 | 7 |

Under the conditions of the invention, it has therefore been shown that it is possible to obtain a heating rate between 15 and 40° C./s between 50 and 500° C. for the entire range of thicknesses, while this rate remains below 12° C./s under the reference conditions R2.

Figure 5:
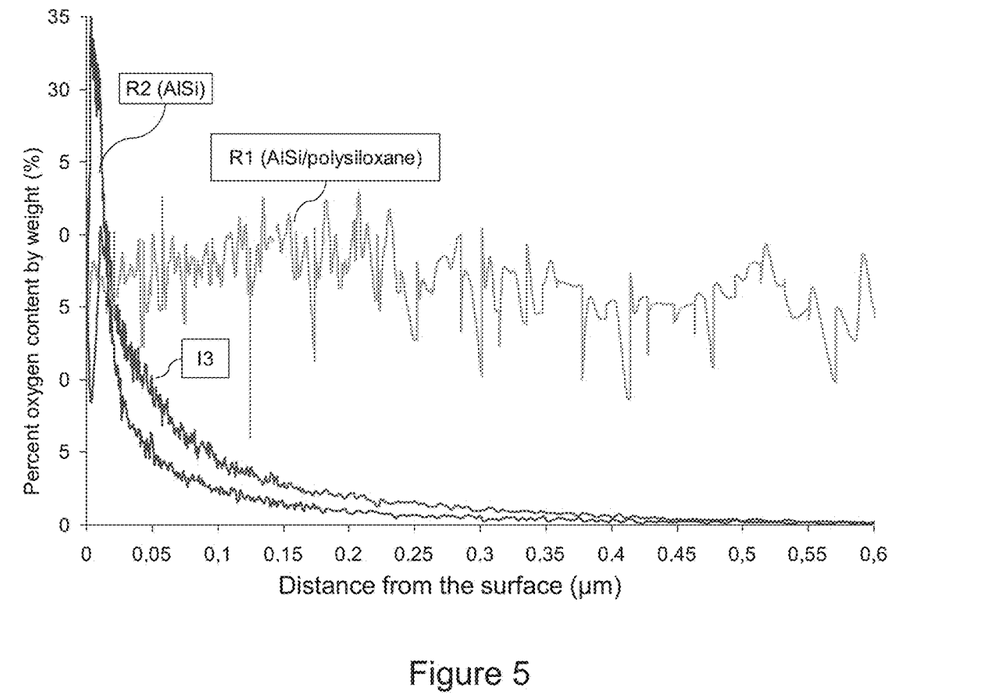
FIG. 5 illustrates surface profile analyses of the oxygen content after heating to 900° C., followed by hot stamping and press hardening.

FIG. 5 illustrates the oxygen analyses by Glow Discharge Optical Spectroscopy performed on blanks heated to 900° C. and then hardened. These analyses express the variation of the oxygen content in percent by weight as a function of the thickness starting from the surface of the press-hardened parts. In relation to the reference tests R1 (polysiloxane base coating) and R2 (metallic pre-coating without application of paint), the application of resin and carbon pigments according to the invention (I3) results in a reduction of the oxide layer on the extreme surface. In the case of test I3, the average oxygen content measured between 0 and 0.01 µm below the surface is 16.7%, while it is 30.3% for test R2. This reduction in the average surface oxygen content makes it possible to reduce the contact resistance, which improves the suitability for spot resistance welding. Without being tied to a specific theory, it is thought that the deposition of the polymer layer according to the invention to a certain extent protects the underlying layer of aluminum alloy and reduces the formation of alumina on the surface.

In the other tests I4 and I5, it has been found that the variation of the oxygen content as a function of the depth is very similar to that illustrated for I3 in FIG. 5.

In the case of the test R1, the use of a polysiloxane base polymer results in the formation of a thick oxide layer. The average oxygen content measured between 0.1 and 0.2 µm below the surface is 18%, while it is less than 10% under the conditions of the invention: 3.8% in the test I3, 3% for the test I4, 4.8% for the test I5. In the case of the test R1, to perform subsequent painting by cataphoresis, it is necessary to remove the oxide layer by expensive sandblasting or shot blasting treatments, while these treatments are not necessary in the case of the invention because the oxide layer has a significantly lower thickness.

In the tests I3-I5 according to the invention, the surface oxygen content after press hardening is relatively independent of the thickness of the polymerized layer deposited on the pre-coating, as shown in the table below.

TABLE 4

Characteristics of the oxygen content on the surface as a function of the thickness of the polymer deposit on the pre-coating

| Test | Thickness of the deposited layer after drying (micrometers) | Average oxygen content between 0 and 0.01 micrometers below the surface (%) | Average oxygen content between 0.1 and 0.2 micrometers below the surface (%) |
|---|---|---|---|
| I4 | 11 | 17.5 | 3 |
| I3 | 15 | 16.6 | 3.8 |
| I5 | 26 | 14.4 | 4.8 |

This means that the initial step of depositing the polymer layer with the particles of carbon can be carried out with a certain tolerance in terms of thickness and therefore does not require the implementation of specific expensive application methods.

Figure 6:
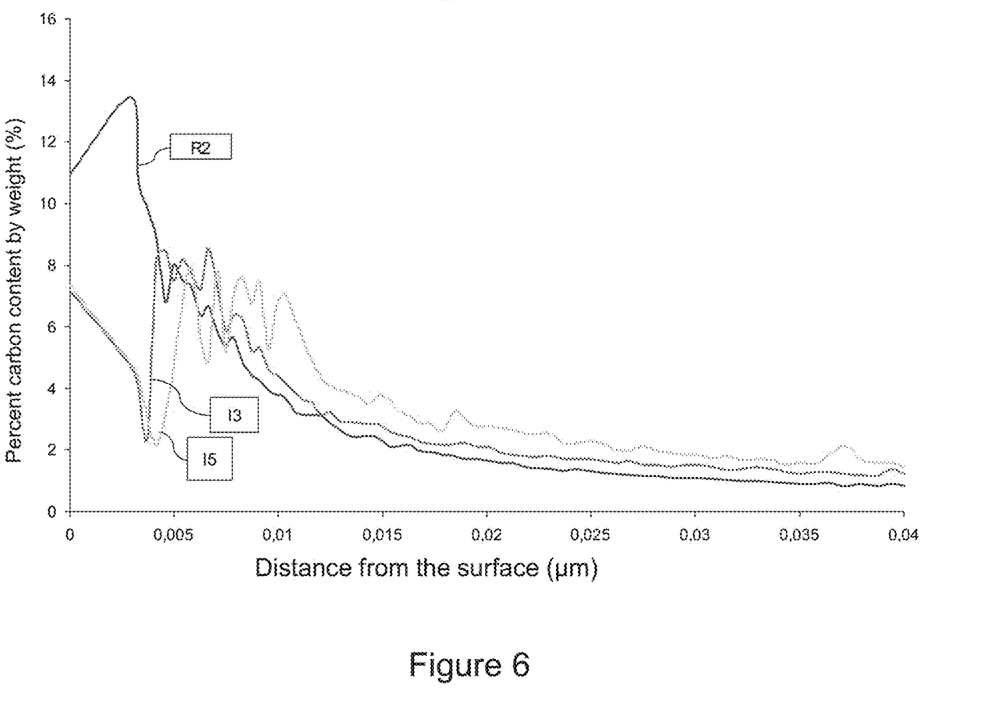
FIG. 6 illustrates surface profile analyses of the carbon content, after heating to 900° C., followed by hot stamping and press hardening.

It will be observed in FIG. 6 that the deposition of carbon pigments with the polymer under the conditions of the invention (tests I3 and I5) does not cause significant surface enrichment in carbon compared to the reference situation R2. Contrary to what would have been expected, the inventors have shown that the addition of carbon pigments even reduces the carbon content on the extreme surface after the press hardening treatment. This indicates that a reaction of the carbon with oxygen in the atmosphere occurs almost completely during the heating phase of the blank in the furnace.

Under the conditions of the invention, tests interrupted at different temperatures during the heating show that the carbon remains present on the surface of the blank for the majority of this step, i.e. that its effect on the reflectivity occurs directly during a very large part of the heating cycle. But, as indicated above, the gradual combination of the atmospheric oxygen with the carbon results in an almost complete disappearance of the latter element when the blank reaches the temperature of 900° C.

Figure 7:
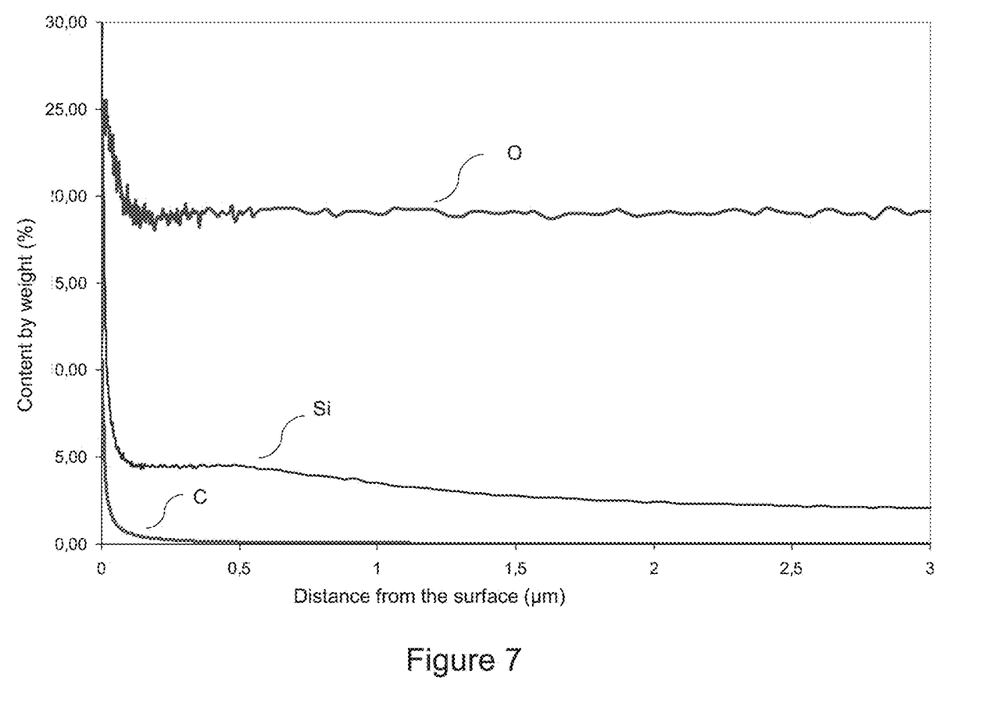
FIG. 7 illustrates surface profile analyses of carbon, oxygen and silicon after treatment at 900° C, followed by hot stamping and press hardening, of a pre-coated blank not according to the invention.

In the case of a deposit laid down under the reference conditions (R1), FIG. 7 shows the variations of the carbon, oxygen and silicon content by weight measured on the parts obtained by heating to 900° C., holding at this temperature for one minute, followed by hot stamping and press hardening. In addition to a higher oxygen content than in the tests according to the invention I3-I5, there is a significant increase in the surface content of silicon, which is present in the form of oxide which modifies the suitability for resistance welding on account of the sharp increase of the contact resistance, which is greater than 1.5 milliohms.

The suitability for spot resistance welding of parts created according to the conditions I2 and R2 was evaluated by executing spot welds under a welding force of 350 daN. The width of the range of weldability was evaluated by the difference between the minimum intensity $I_{min}$ making it possible to obtain a spot diameter of 6 mm associated with a satisfactory mechanical strength, and the maximum intensity $I_{max}$ beyond which there is an expulsion of liquid metal during the welding. The width of the weldability range ($I_{max}-I_{min}$) is approximately 1500 A, equivalent for the conditions 12 and R2. Likewise, it has been found that the results of crosswise tensile tests on the spot welds are identical. For a welding intensity $I_{min}$, the mechanical strength is equal to 3370 N (condition R2) and 3300 N (condition I2). For a welding intensity $I_{max}$, the mechanical strength is equal to 4290 N (condition R2) and 4127 (condition I2). Therefore, the application of polymer and carbon particles according to the invention does not modify the suitability for spot welding. The invention can be implemented without modifying the settings of the welding machines. It is possible to weld a sheet pre-coated with aluminum or aluminum alloy with a deposit of polymer and carbon according to the invention and a sheet that has only been pre-coated, in the assurance that the welding conditions will be perfectly adequate for these two types of sheets.

Figure 8:
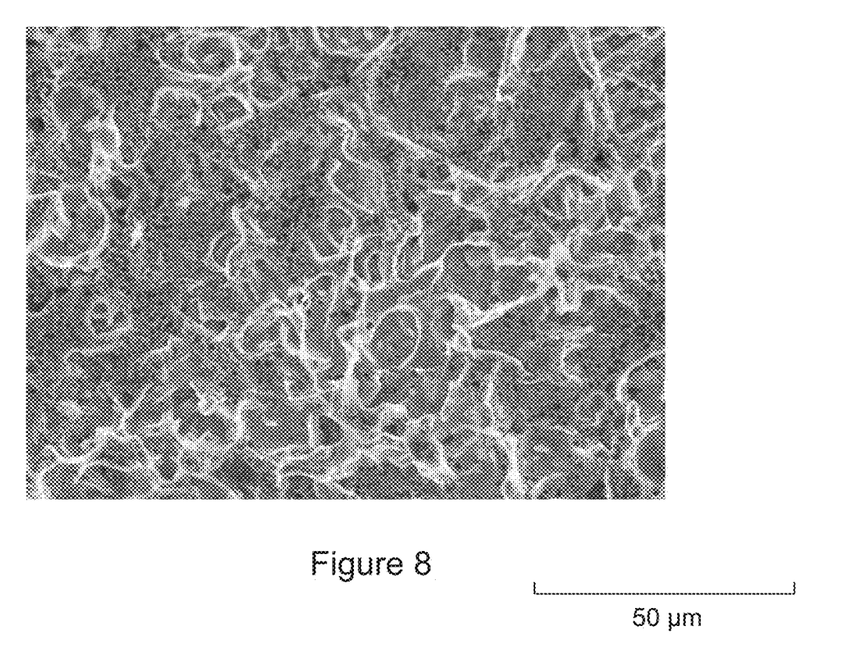
FIG. 8 shows a hot stamped part that does not comprise the prior deposit of a polymer layer with carbon pigments.

The surfaces of parts hot stamped and hardened under conditions I1-3 and R2 were observed in terms of the zenith under the Scanning Electron Microscope. Under the reference condition (R2, FIG. 8), the surface roughness is significant, which guarantees good paintability by later cataphoresis.

Figure 9:
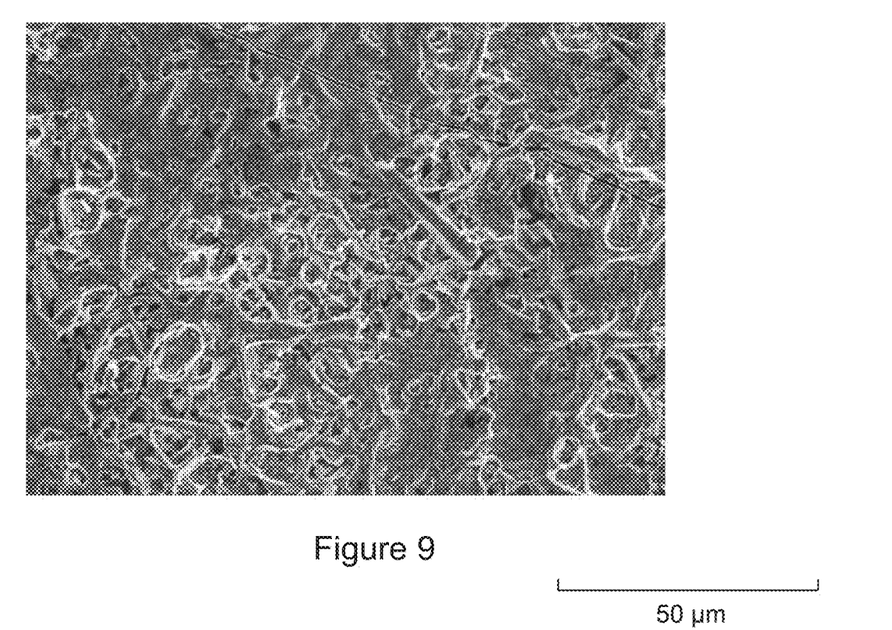
FIG. 9 shows the appearance of the surface of a hot stamped part according to the invention.

FIG. 9 shows that the surface roughness of the part fabricated under the condition of the invention (I2) is similar. Identical observations were conducted for conditions I1 and I3. Because it was noted above, that the surface of the parts fabricated according to the invention is not enriched in carbon, that guarantees that the suitability for cataphoresis is not reduced by the prior application of the polymer and carbon pigments.

Example 2

The resistance to different forms of corrosion of hot stamped and press hardened parts fabricated was evaluated according to the conditions I2 (AlSi pre-coating and painting according to the invention) and R2 (AlSi pre-coating alone) from Table 1.

The resistance to cosmetic corrosion was determined under the following conditions: scratches of different depths were made, affecting only the coating (condition A) or also affecting the substrate (condition B) of hot stamped parts. These parts were subjected to cycles of temperature and moisture in a saline mist for six weeks under the conditions described in the "New VDA Test 233-102", which is in itself known. The width of blistering at the level of the scratch was then measured. The results are presented in Table 5.

TABLE 5

Results of cosmetic corrosion

|  | Width of blistering (mm) Condition A | Width of blistering (mm) Condition B |
|---|---|---|
| I2 | 2.7 | 4 |
| R2 | 2.6 | 4.2 |

Compared to the reference test R2, it was found that the application of paint according to the invention does not reduce the resistance to cosmetic corrosion.

The resistance to perforating corrosion was evaluated by tests conducted over 12 weeks under the "New VDA" test conditions indicated above. The weight losses measured for the parts fabricated under conditions I2 and R2 are as follows:

TABLE 6

Results of cosmetic corrosion

|  | Weight loss (g/m$^2$) |
|---|---|
| I2 | 170 |
| R2 | 180 |

Compared to the reference test R2, the application of the paint according to the invention does not reduce resistance to perforating corrosion.

1 mm parts hot stamped and fabricated according to conditions I2 and R2 were subjected to painting by cataphoresis. The adherence of this cataphoresis layer after scratches in a checkered pattern was measured, followed by immersion in water at 50° C. for 10 days. It was found that the application of the paint according to the invention does not reduce the adherence of the cataphoresis layer.

Example 3

Blanks made of 22MnB5 steel 1, 5 and 2 mm thick comprising on both their sides a pre-coating 23 µm thick containing 9% Si and 3% Fe, the balance being aluminum and unavoidable impurities, were acquired. On some of the blanks, a layer composed of polymer and carbon pigments was deposited by roll coating over the entirety of the two principal surfaces under conditions I2 according to the invention indicated in Table 1. The other blanks were not painted (condition R).

The blanks were heated to 900° C., held at this temperature for one minute, then hot stamped and hardened by holding them in the stamping tool. The diffusible hydrogen content was measured using a thermal desorption analysis method, which is in itself known. The diffusible hydrogen content of these blanks is presented in Table 7.

TABLE 7

| | Diffusible hydrogen content | |
|---|---|---|
| Coating | Thickness of the flan (mm) | Diffusible hydrogen content (ppm) |
| I2 | 1.5 | 0.15 |
| R | 1.5 | 0.21 |
| I2 | 2 | 0.17 |
| R | 2 | 0.25 |

The deposit of the specific paint according to the invention makes it possible to reduce very significantly the content of diffusible hydrogen. Without being bound by a theory, the inventors think that the application of the deposit according to the invention reduces the length of time during which the hydrogen can be adsorbed during the heating step prior to stamping. The invention therefore makes it possible to reduce significantly the sensitivity to delayed cracking of the hot stamped and hardened parts. The implementation of the invention therefore makes it possible to utilize steels that contain higher levels of alloy elements and results in a higher mechanical strength after hot stamping, all without increased risk with reference to delayed cracking.

Example 4

Blanks made of 22MnB5 steel 1, 2 and 2.5 mm thick comprising on both their sides a pre-coating 23 µm thick containing 9% Si and 3% Fe, the balance being aluminum and unavoidable impurities, were acquired. The pre-coating is constituted by a thin layer of intermetallic alloy, the majority of which consists of $Fe_2Al_3$, $Fe_2Al_5$ and $Fe_xAl_ySi_z$, approximately 4 µm thick in contact with the steel substrate. This intermetallic layer is overlaid by a layer of Al—Si metallic alloy 19 µm thick.

On some of the blanks a layer composed of polymer and carbon pigments was deposited by roll coating over the entirety of the two principal surfaces under the conditions I2 indicated in Table 1.

These blanks were heated to 900° C. The thermal cycles measured by thermocouples made it possible to determine the thermal emissivity. For the sheets painted according to the invention, the thermal emissivity decreases during the heating cycle from approximately 0.6 to 0.3. For the unpainted reference sheets, the emissivity decreases from approximately 0.2 to 0.1 during the heating cycle.

With reference to the schematic FIG. 2, blanks were assembled by laser welding, wherein these blanks were two blanks of different thicknesses. The thinner of the blanks, identified as 8, with a thickness $e_8$, is constituted by a sheet pre-coated with the above aluminum alloy. The thicker blank, identified as 7, with a thickness $e_7$, is constituted by a sheet pre-coated with the same aluminum alloy and a polymerized layer according to condition I2 above. To prevent the formation of intermetallic compounds in the zone melted during welding, a pulsed laser was used to remove the metallic Al—Si—Fe alloy coating by ablation on both surfaces over a width of 1.1 mm from the periphery of the blanks, leaving the thin layer of intermetallic alloy in place. In the case of unpainted pre-coated blanks, only the layer of metallic alloy was removed; in the case of pre-coated blanks with a polymerized layer, the layer of metallic alloy as well as the polymerized layer were removed over the width indicated above. An ablation rate of 3 m/mn makes it possible to obtain the desired results.

These welded blanks were then heated to 900° C. by measuring the temperature using thermocouples placed in each of the two parts 7 and 8 of the welded blanks (blanks with thicknesses $e_7$ and $e_8$). The heating time $\Delta t_{20}^{900}$ in each of parts 7 and 8 was thereby determined as well as the temperature difference between these two parts at every instant of the heating. The maximum temperature difference during the heating cycle $\Delta\Theta_7^8$, as well as $\Delta t_{20}^{900}$ are presented in Table 8. The welded blanks are then hot stamped and press hardened.

TABLE 8

| Test ID | $e_7$ (mm) blank without polymerized layer | $e_8$ (mm) blank with polymerized layer | $\frac{e_7}{e_8}$ | $\Delta t_{20}^{900}$ (7) (s) | $\Delta t_{20}^{900}$ (8) (s) | $\Delta\Theta_7^8$ (° C.) |
|---|---|---|---|---|---|---|
| I4 | 2 | 1 | 2 | 160 | 170 | 44 |
| I5 | 2.5 | 1 | 2.5 | 175 | 170 | 2 |

By comparison, Table 9 presents the results obtained during the heating of a welded blank constituted by two blanks pre-coated with Al—Si alloy, unpainted, with respective thicknesses of 2 mm and 1 mm.

TABLE 9

| Test ID | $e_7$ (mm) blank not painted | $e_8$ (mm) blank not painted | $\frac{e_7}{e_8}$ | $\Delta t_{20}^{900}$ (7) (s) | $\Delta t_{20}^{900}$ (8) (s) | $\Delta\Theta_7^8$, (° C.) |
|---|---|---|---|---|---|---|
| R3 | 2 | 1 | 2 | 360 | 170 | 155 |

Under the conditions of the invention (test I4 and I5), the heating time is very similar in the two parts 7 and 8 that make up the welded joint. This makes it possible to ensure that the microstructures of the steel substrate after austenitization and of the coating obtained by interdiffusion will be very similar in the parts 7 and 8 of the welded joint. By comparison, the reference test R3 results in a situation in which the thicker part of the welded blank is heated to 900° C. much more slowly than the thin part. If is therefore necessary for the thin part of the welded joint to be held at 900° C. for 190 s so that the thick part reaches the temperature of 900° C., which can lead to an undesirable austenitic grain growth in the steel substrate of the thinner part, or to an excessive interdiffusion between the pre-coating and the substrate in this part. The method according to the invention makes it possible to prevent these problems.

In test I5, where the ratio $$\frac{e_7}{e_8}$$

is equal to 2.5, the temperature difference between the two parts of the welded joint at any point in the heating cycle is particularly low, less than 2° C., while it is equal to 44° C. in test I4

$$\left(\frac{e_7}{e_8} = 2\right).$$

This preferential mode in which the thickness ratio is between 2.2 and 2.6 will be selected when the objective is the greatest possible thermal uniformity during the heating of welded blanks.

Therefore the invention makes the fabrication of hot stamped pieces possible under conditions of increased productivity, exhibiting a good suitability for spot welding and painting by cataphoresis, high resistance to corrosion and to delayed cracking. These parts can be advantageously used as structural parts or reinforcements in the field of automobile construction.

What is claimed is:

1. A fabrication method for a press hardened part comprising the steps of:
    providing a sheet or a steel substrate blank for heat treatment;
    applying a pre-coating having at least one layer of aluminum or aluminum alloy in contact with the steel substrate on at least one of the principal faces of the sheet or blank; then depositing on the pre-coating, a polymerized layer having a thickness between 2 and 30 μm and comprising a polymer that does not contain silicon, a nitrogen content of less than 1% by weight and carbon pigments in a quantity between 3 and 30% by weight; then
    heating the blank or the sheet, including the pre-coating and the polymerized layer, to an austenitization temperature Tγ of the steel substrate to decompose the polymerized layer and remove substantially all of the carbon from the polymerized layer from the blank or the sheet via combination with atmospheric oxygen in the furnace, and to obtain an interdiffusion between the steel substrate and the pre-coating and to give the steel a partly or totally austenitic structure, then
    hot stamping the blank or the sheet to obtain a part; then
    cooling the part by holding the part in a stamping tool so that the microstructure of the steel substrate includes, at least in a portion of the part, martensite or bainite.

2. The method according to claim 1, wherein a thickness of the sheet or blank is between 1 mm and 2 mm and a heating rate of the blank or sheet between 50 and 500° C. is between 15 and 35° C./s.

3. The method according to claim 1, wherein the at least one layer of aluminum or aluminum alloy is more than 50% of a thickness of the pre-coating.

4. The method according to claim 1, wherein the polymer is selected from the group consisting of C, H, O or N.

5. The method of claim 1, wherein a carbon content of the steel substrate is between 0.07 and 0.5%, by weight.

6. The method of claim 1, wherein the carbon content of the steel substrate is between 0.09 and 0.38%, by weight.

7. The method of claim 1, wherein the carbon content of the steel substrate is between 0.15 and 0.25%, by weight.

8. The of claim 1, wherein the heating includes heating the pre-coating and the polymerized layer to 900° C.

9. The method of claim 1, wherein the polymerized layer directly contacts the at least a part of the pre-coating.

* * * * *